(12) United States Patent
Dillon et al.

(10) Patent No.: US 8,397,565 B1
(45) Date of Patent: Mar. 19, 2013

(54) HIGH RESPONSE AIR ANGLE PROBE

(75) Inventors: Daniel R Dillon, West Palm Beach, FL (US); Paul D Johnson, Palm Beach Gardens, FL (US); Frank W Huber, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 231 days.

(21) Appl. No.: 13/087,433

(22) Filed: Apr. 15, 2011

(51) Int. Cl.
*G01P 5/00* (2006.01)
*G01F 1/46* (2006.01)
*G01D 21/00* (2006.01)

(52) U.S. Cl. .................. 73/170.11; 73/861.65; 73/866.5
(58) Field of Classification Search .......................... None
See application file for complete search history.

(56) References Cited

U.S. PATENT DOCUMENTS

| | | | | |
|---|---|---|---|---|
| 4,733,975 A * | 3/1988 | Komanetsky et al. | ........ | 374/144 |
| 5,319,970 A * | 6/1994 | Peterson et al. | ........... | 73/861.65 |
| 5,639,964 A * | 6/1997 | Djorup | ........................ | 73/170.12 |
| 7,010,970 B2 * | 3/2006 | Rediniotis et al. | ......... | 73/170.11 |
| 2003/0041465 A1* | 3/2003 | Brusius | ........................... | 33/286 |
| 2005/0273278 A1* | 12/2005 | Sprague | ......................... | 702/45 |

* cited by examiner

*Primary Examiner* — Harshad R Patel
(74) *Attorney, Agent, or Firm* — John Ryznic

(57) ABSTRACT

A high response air angle probe to measure a flow direction in an air flow near or above Mach one. The probe is rotatably secured within an assembly with marking to indicate when a desired position of the probe within the air flow has been found. The probe includes a row of three high response pressure transducers on a leading edge region to detect when the probe is at a certain position within the air flow.

15 Claims, 9 Drawing Sheets

HIGH RESPONSE AIR ANGLE PROBE

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a high response air angle probe, and more specifically to a high response air angle probe used for testing airflow in a stator vane assembly.

2. Description of the Related Art Including Information Disclosed Under 37 CFR 1.97 and 1.98

In a gas turbine engine, a turbine section includes multiple stages or rows of stator vanes and rotor blades. A stage of stator vanes is located immediately upstream in the flow direction from a stage of rotor blades and function to guide the flow into the rotating blades for maximum efficiency. The stator vane assembly is designed for use in a specific engine with airfoils having a specific shape and angle and with a specific throat area formed between adjacent airfoils to control airflow and pressure.

A new design for a stator vane assembly requires testing of airflow through the vanes in order to determine if a proper design has been produced. Proper airflow testing of a stator vane assembly also requires the testing to be done with an adjacent stage or stages of rotor blades in order to account for the full effect of the airflow passing through the turbine. Airflow testing is required in order to validate the design of a new airfoil stator vane.

Currently, testing of airflow through a stator vane assembly is performed using low flows. Compressed air used for testing is stored in a pressure tank and then released to flow through the vane assembly where the airflow direction can be measured using standard air flow angle probes. This process for testing airflow is limited to low pressures because of the limit in the size and pressure of the compressed air storage tank. In order to test a vane assembly for high volume flows with high pressures, a number of high pressure compressors is required or a very large compressed air storage tank is required. A large tank capable or storing a large volume of compressed air at high pressures would be very cost prohibitive, especially for a medium to small size testing facility.

BRIEF SUMMARY OF THE INVENTION

A high response air angle probe for use in testing airflow through a stator vane assembly in which a short burst of compressed air having a high pressure is used for testing. The high response angle probe is capable of quickly determining the air flow angle before the air flow is exhausted. The high response air angle probe includes one or more rows of high response pressure transducers positioned along the probe with one transducer centered and two on each side at equal and opposite angle. The transducers are in the natural frequency range of from 100 kHz to 1,000 kHz and preferably at around 300 kHz and can measure air angles in air flow near to or above Mach one. The probe is capable of measuring a total pressure, a static pressure, and an air flow angle.

DETAILED DESCRIPTION OF THE INVENTION

A high response air angle probe that is used for testing air flows through a stator vane assembly in which the testing period is a very short time because of the limit in the size of the compressed air storage tank used to supply the air flow. The probe is for use not with a steady-state test but for a very quick test commonly referred to as a blown-down test of around five seconds. Because of the high response time of the probe, high volume and pressure flow testing can occur using smaller compressed air storage tanks.

Figure 1:
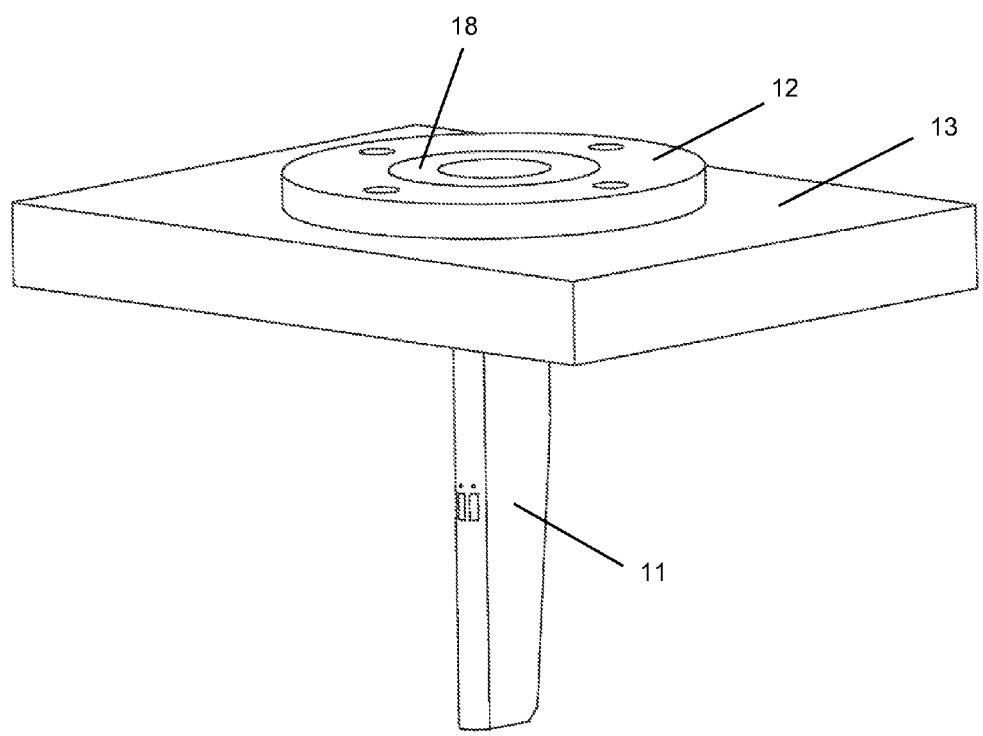
FIG. 1 shows an isometric view of a first embodiment of a high response air angle probe assembly of the present invention.
Figure 2:
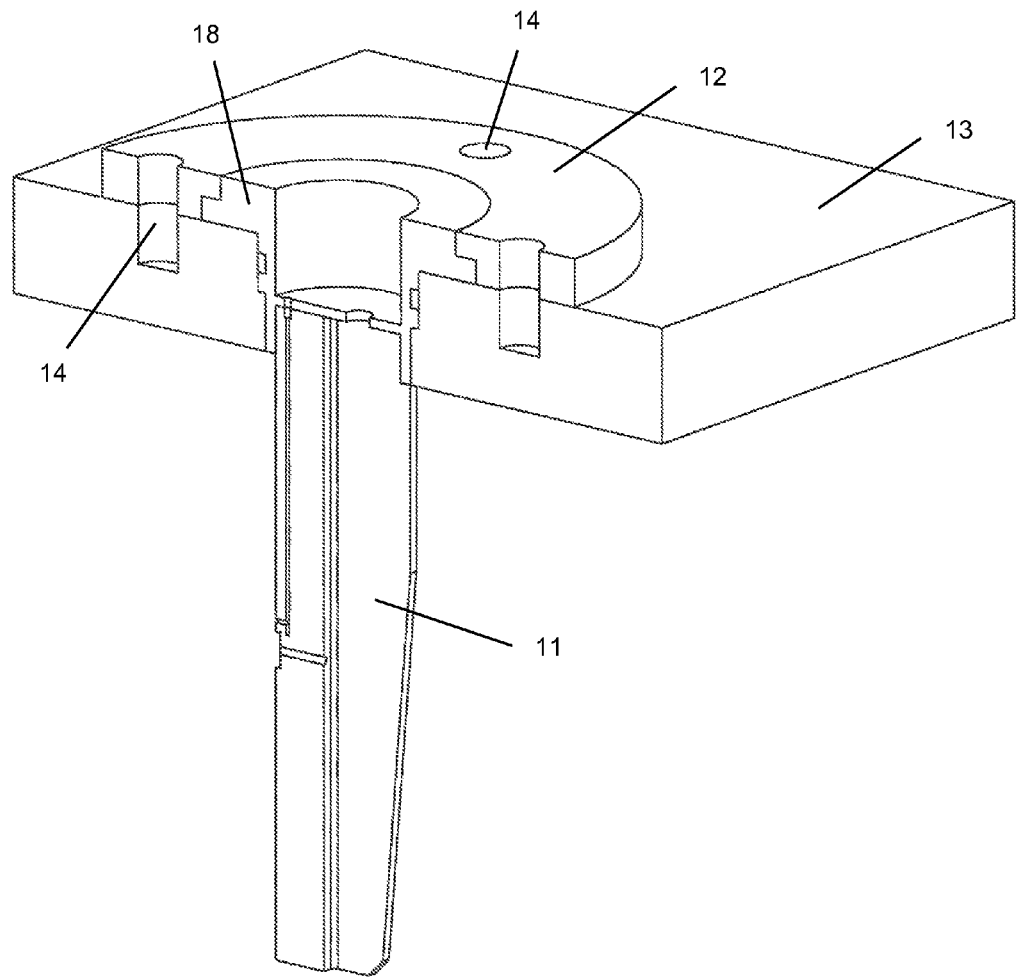
FIG. 2 shows a cutaway view of the probe assembly of FIG. 1.

FIG. 1 shows a view of the high response air angle probe assembly in a first embodiment. The probe assembly includes a probe 11 having the high response pressure transducers mounted on a surface of the probe 11, a clocking flange 12, a mounting plate 13, and a mounting disk 18 for the probe 11. The probe 11 is secured to the mounting disk 18 against relative rotation. FIG. 2 shows a cutaway view of the probe assembly. The mounting plate 13 includes a circular hole in which the probe 11 is rotatably secured. The mounting disk 18 and the clocking flange 12 both include annular grooves so that the clocking flange 12 can secure the mounting disk 18 to the mounting plate 13 while allowing for rotation of the mounting disk—and thus the probe 11—relative to the mounting plate 13. A number of bolts holes 14 are used to secure the clocking flange 12 to the mounting plate 13. In this embodiment, four bolt holes 14 are used. When tightened, these bolts also clamp and hold the probe and mounting disk 18 from rotating. The angle of the probe is set to testing, but can be changed between tests by loosening the bolts and repositioning the mounting disk 18.

Figure 3:
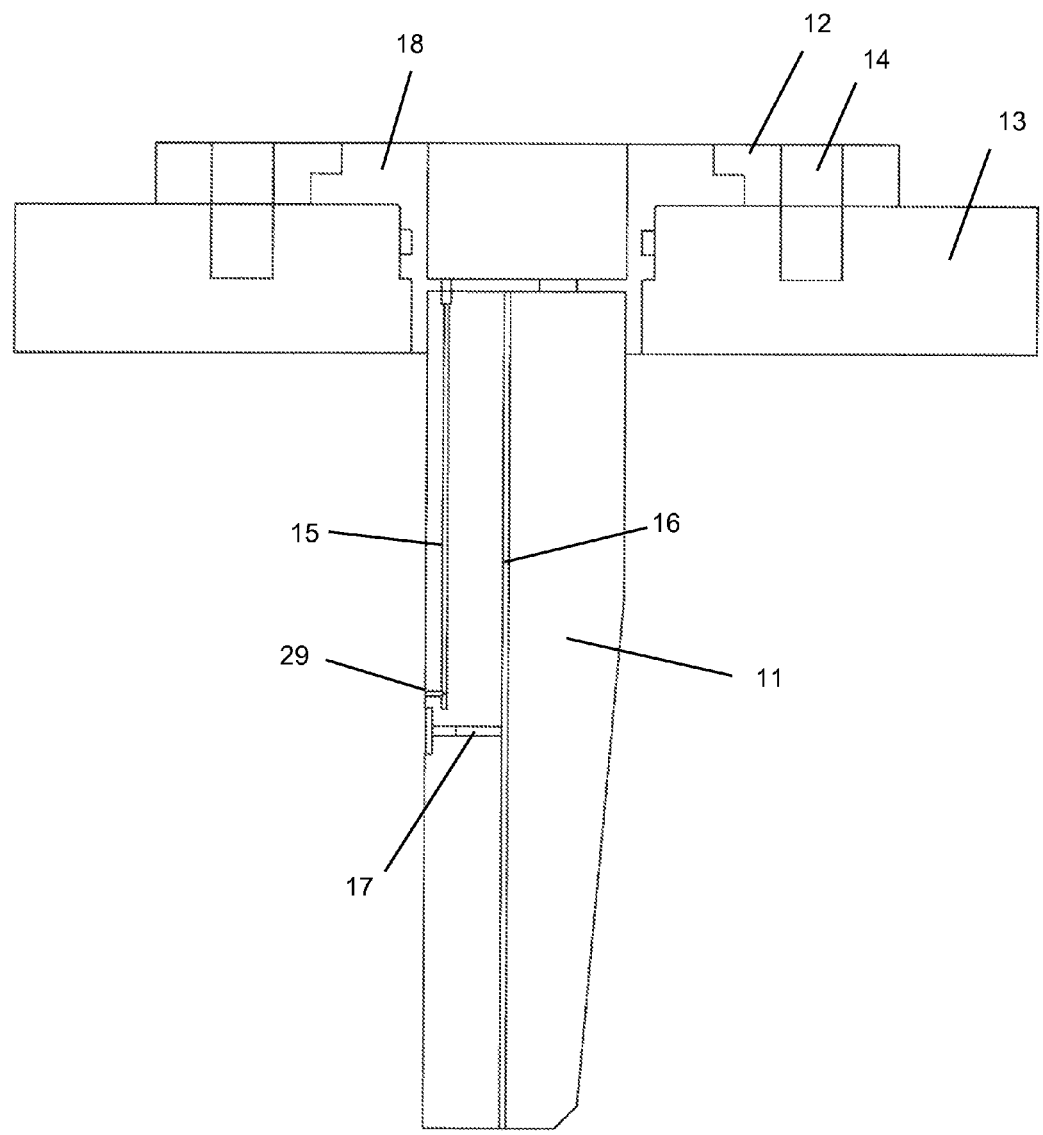
FIG. 3 shows a cross section view of the probe assembly of FIG. 1.

FIG. 3 shows a cross section of the probe assembly with the probe 11 secured to the mounting disk 18 that is secured within the flange of the clocking plate 12. The probe 11 includes three hypo-tube leads 15 that extend from a cavity formed above the mounting disk 18 and open onto the surface of the probe 11 on which the air flow will strike. The probe 11 also includes a transducer wire lead 16 and 17 for the high response pressure transducers that are mounted on the front side of the probe 11.

Figure 4:
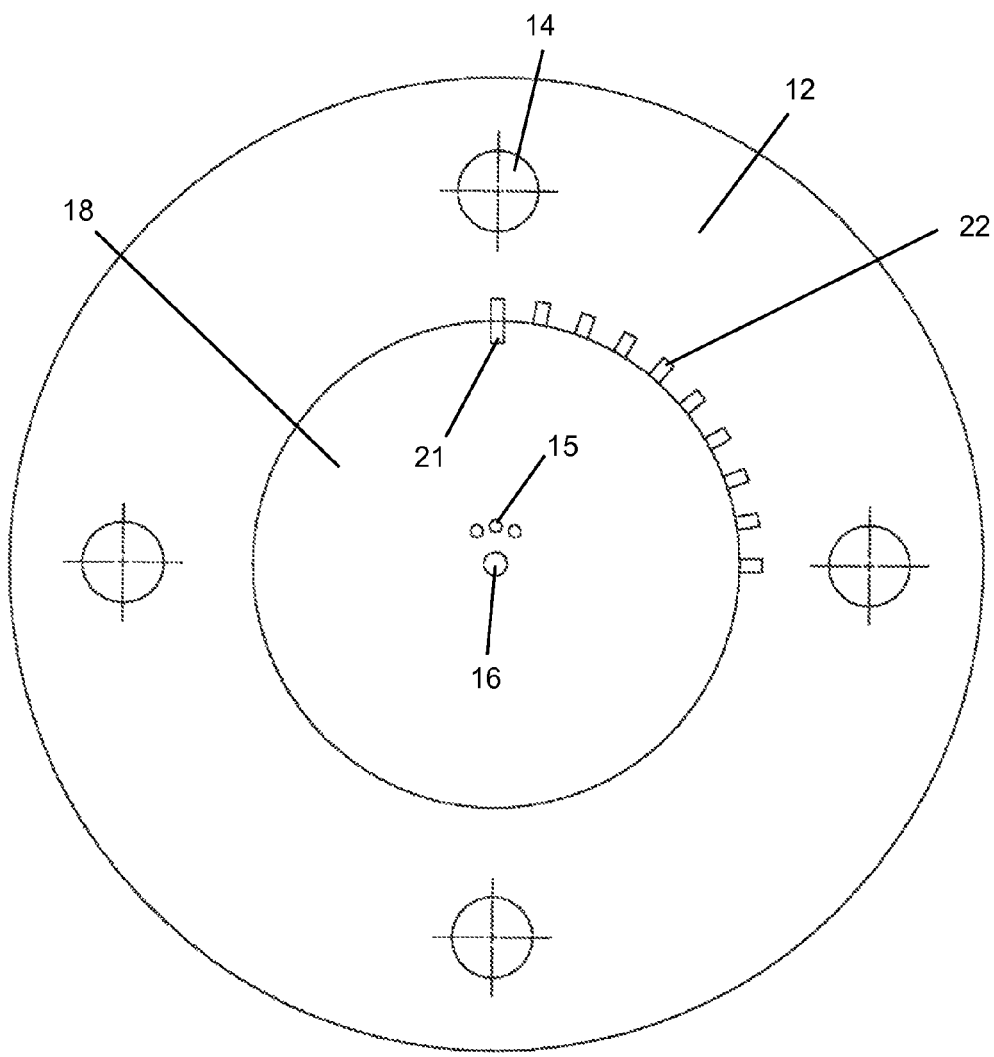
FIG. 4 shows a top view of the probe assembly of FIG. 1.

FIG. 4 a top view of the probe assembly and includes markings 22 on the clocking plate 12 and a marking 21 on the mounting disk 18 of the probe 11. The three hypo-tube leads 15 and the transducer wire lead 16 is shown opening onto the top of the mounting disk 18. The markings 21 and 22 allow for the angle of the probe 11 to be determined in relation to the mounting plate 12. The markings allow for easy probe alignment through a wide arc.

Figure 7:
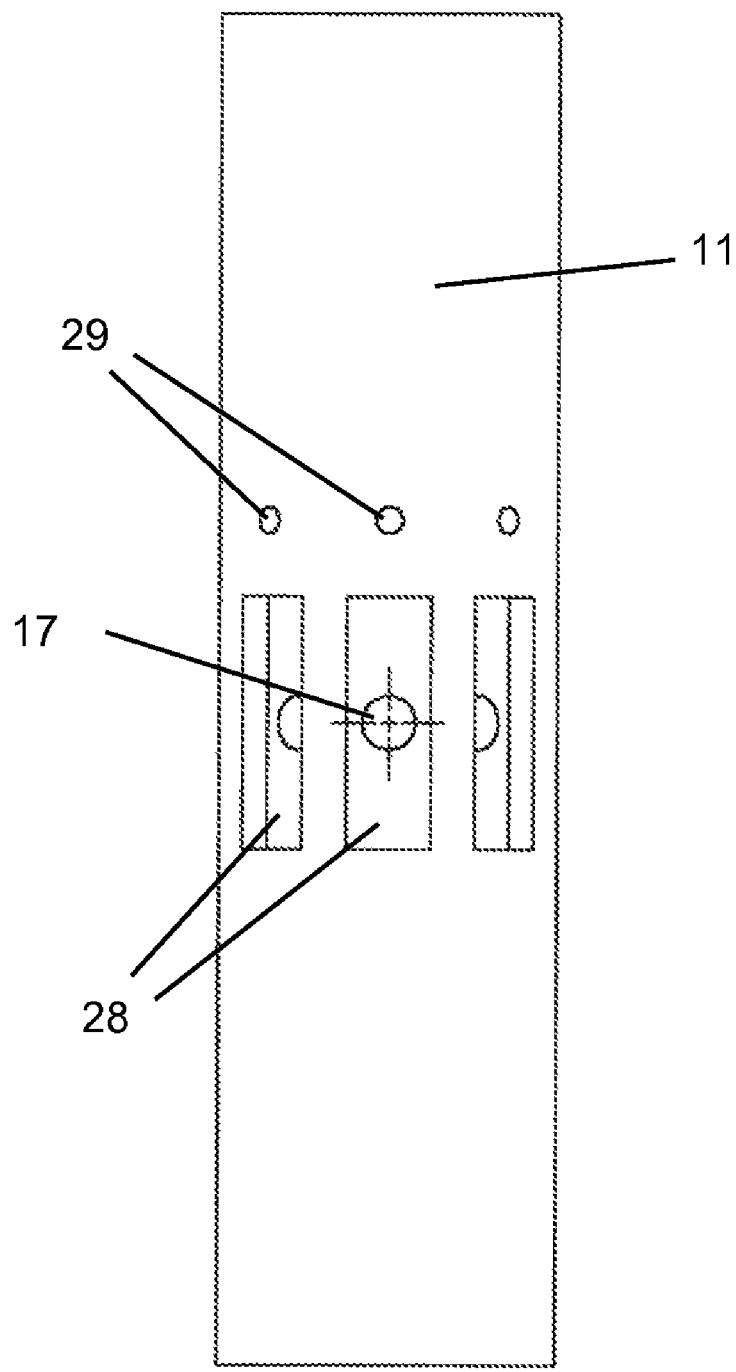
FIG. 7 shows a front view of the probe of FIGS. 1 and 5 with an arrangement of three pressure transducers.

FIG. 7 shows a section of the probe 11 that the high response pressure transducers 28 are mounted to for both embodiments of the high response air angle probe of the present invention. The probe 11 includes a leading edge region with the three openings 29 of the hypo-tube leads 15. A rectangular opening is formed in the probe surface to receive the three high response pressure transducers 28 so that they are mounted flush with the leading edge region surface of the probe 11. The high response pressure transducers 28 include wires that extend through the transducer lead wires 17 that are connected to equipment outside of the probe assembly. The probe will use special pressure transducers that have a small foot print, high natural frequency, extreme resistance to vibration and shock, and a wide temperature range. The high response pressure transducers 28 used in the present invention are the LQ-062 series ultra miniature thin line IS pressure transducers supplied from KULITE Semiconductor Products, Inc. of Leonia, N.J. The transducer with a 300 kHz natural frequency has an input pressure of 3.5 bar and a pressure range of 50 psi. In the probe of the present invention, three high response pressure transducers 28 are used with one centered and two offset at equal angles of from 30 degrees to 45 degrees. In other embodiments, several rows of three transducers 28 can be used spaced along the axial length of the probe 11.

Figure 5:
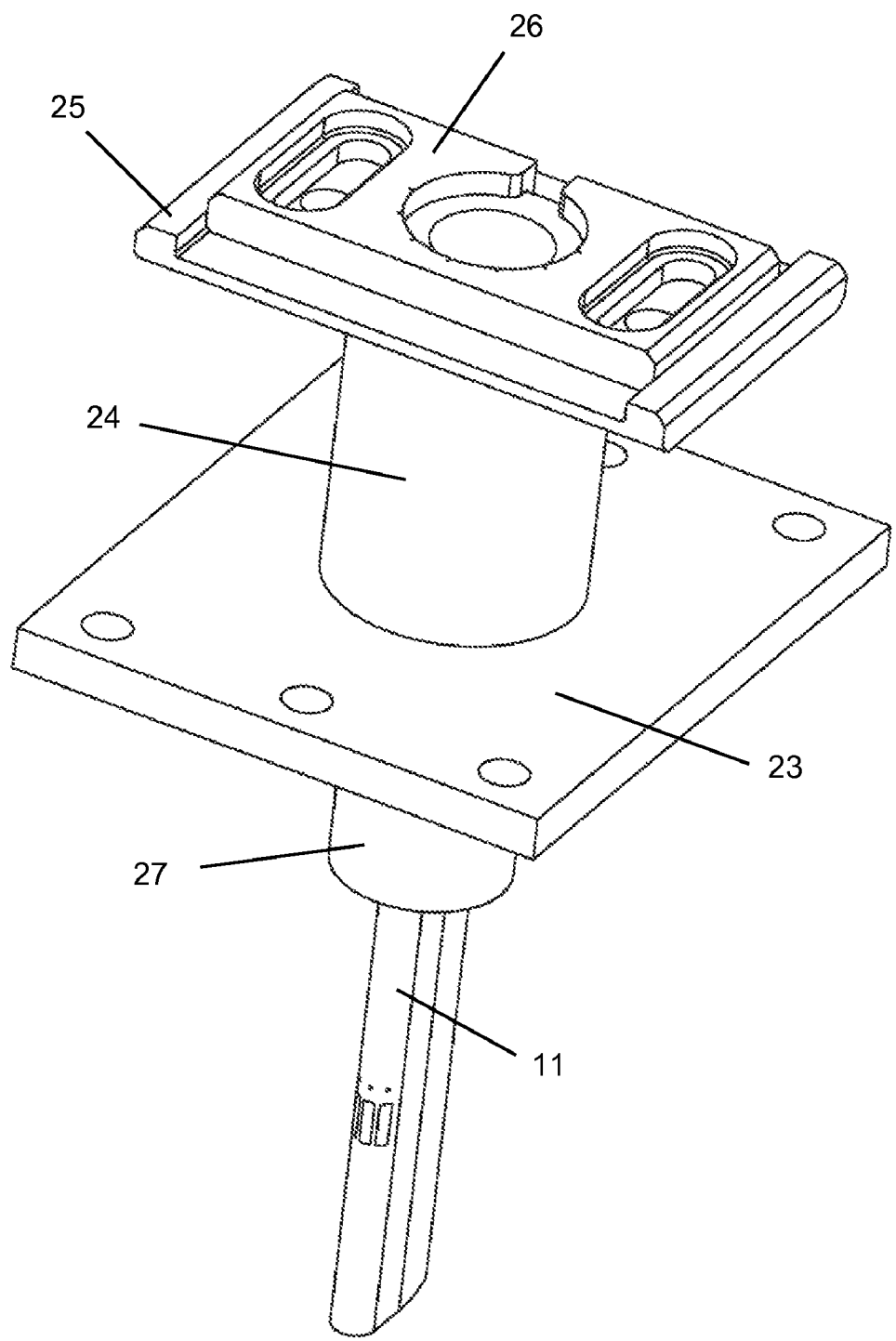
FIG. 5 shows an isometric view of a second embodiment of a high response air angle probe assembly of the present invention.
Figure 6:
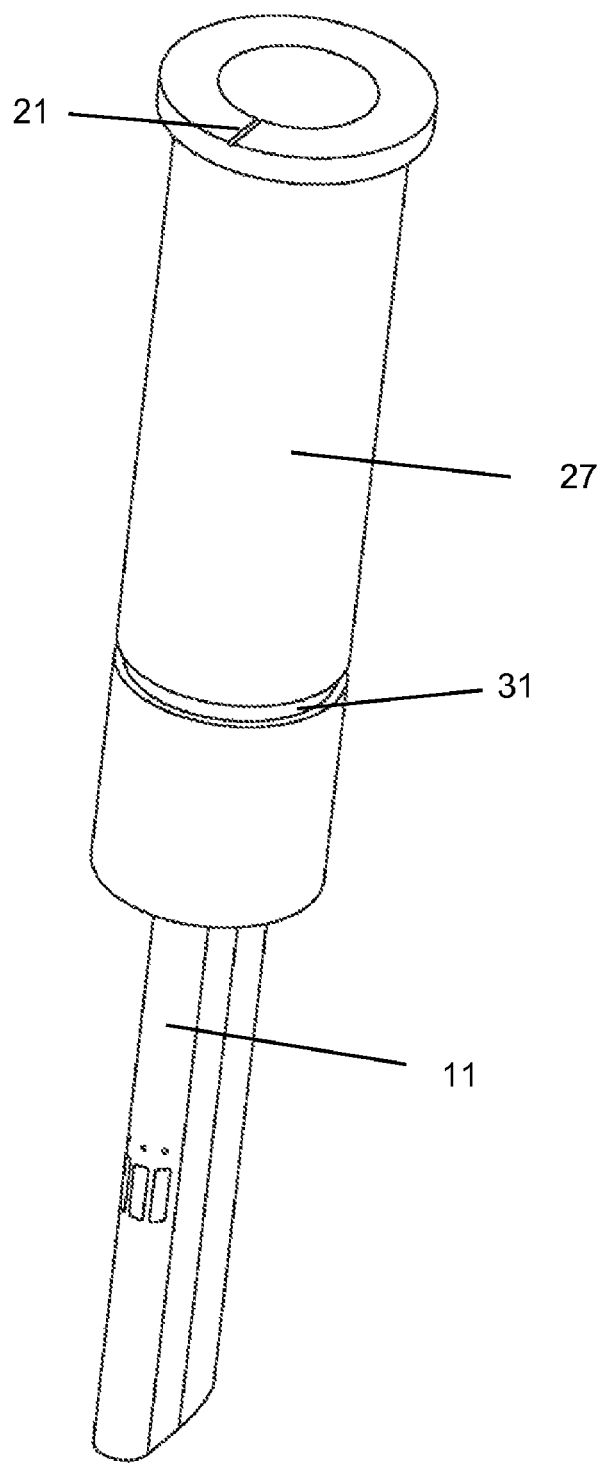
FIG. 6 shows an isometric view of the probe only of FIG. 5.

FIG. 5 shows a second embodiment of the probe assembly of the present invention. In the FIG. 5 embodiment, the probe 11 is formed with an integral cylinder 27 that has a flange on the upper side to engage the flange on a clocking plate. An O-ring groove 31 is formed on the outer surface of the cylinder 27 to receive an O-ring (FIG. 6). A lower mounting plate 23 with a cylindrical collar 24 and an upper mounting plate 25 secured together and include a central opening in which the probe 11 and the cylinder 27 rotatable fit. The O-ring within the annular groove 31 forms a seal with an inner surface of the collar 24. A clocking plate 26 is secured over the upper mounting plate 25 to rotatably secure the probe within the probe assembly.

Figure 8:
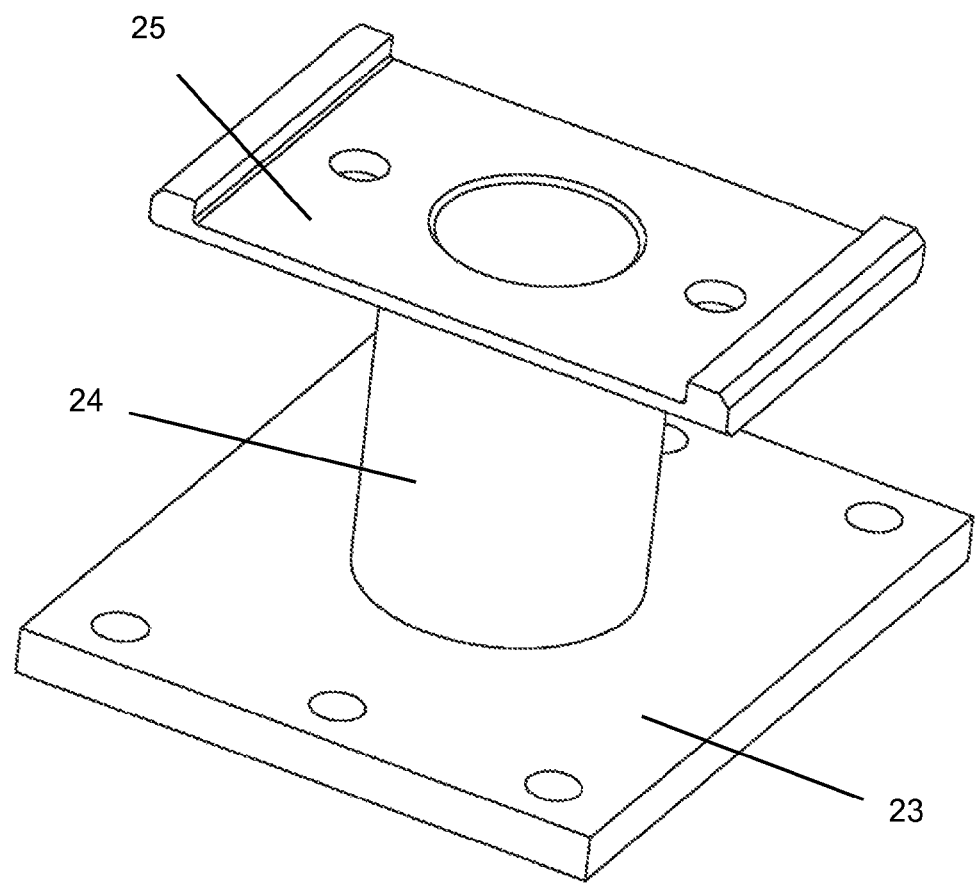
FIG. 8 shows an isometric view of the upper and lower mounting plates and the collar for the probe assembly of FIG. 5.

FIG. 8 shows the cylindrical collar 24 positioned between the lower mounting plate 23 and the upper mounting plate 25. These three pieces can be made separately and bonded together to form one integral unit or can be assembled together without bonding. The lower mounting plate includes holes for bolts to secure the probe assembly to a surface where the probe is to measure air flow direction. The upper mounting plate 25 includes two holes for the bolts that fit through the slots 30 in the clocking plate 26.

Figure 9:
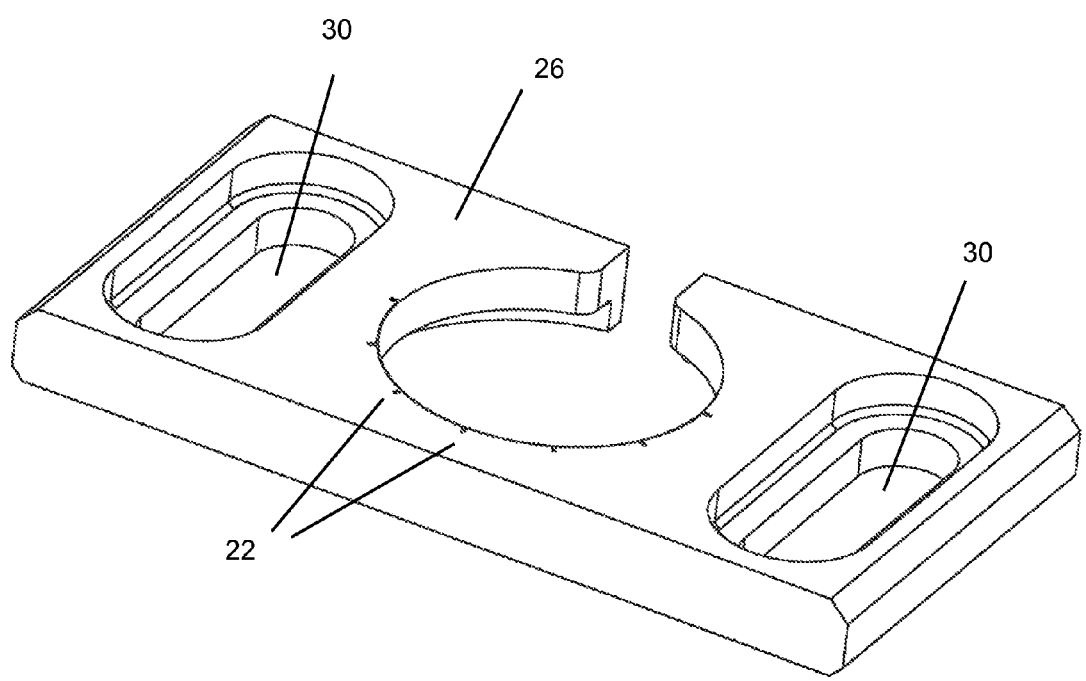
FIG. 9 shows an isometric view of the clocking plate for the probe assembly of FIG. 5.

FIG. 9 shows the clocking plate 26 with an annular flange facing downward that the flange on the cylinder 27 rotates within when the clocking plate 26 is secured to the upper mounting plate 25. The clocking plate 26 includes two slots 30 to receive the bolts that secure the probe assembly together. The probe cylinder 27 includes a marking 21 and the clocking plate 26 includes several markings 22 so that the angle of the probe 11 with respect to the mounting plate can be determined.

The high response air angle probe is used to determine an air angle of flow over a wide Mach number range. The probe uses a number of high response pressure transducers to allow for high accuracy during short duration testing. The probe includes a variable and controllable probe angle relative to flow. The probe uses standard hypo-tube pressure sensors as a calibration or validation of high response sensor data. A probe may have transducers at multiple radial locations along the probe.

We claim the following:

1. A high response air angle probe for testing airflow at near or above Mach one, the air angle probe comprising:
    a probe having a leading edge region;
    three hypo-tube leads formed within the probe and that open onto the leading edge region of the probe;
    three high response pressure transducers located on the leading edge region of the probe;
    a mounting disk rotatably secured to the probe;
    a clocking flange with an opening in which the mounting disk and the probe can rotate within; and,
    markings on the mounting disk and the clocking flange so that an angle of the probe relative to the clocking plate can be determined.

2. The high response air angle probe of claim 1, further comprising:
    the three high response pressure transducers are spaced along an axial length of the probe.

3. The high response air angle probe of claim 1, further comprising:
    the high response pressure transducers have a natural frequency of around 150 to 1,000 kHz with a pressure range of around 5 to 1,000 psi.

4. The high response air angle probe of claim 1, further comprising:
    the high response pressure transducers have a natural frequency of around 300 kHz with a pressure range of around 50 psi.

5. The high response air angle probe of claim 1, further comprising:
    the high response pressure transducers are offset from each other from 30 degrees to 45 degrees from a leading edge of the probe.

6. The high response air angle probe of claim 1, further comprising:
    the high response pressure transducers are capable of detecting an air flow angle within 5 seconds of starting the air flowing.

7. A high response pressure transducer probe assembly for measuring an air flow angle in a Mach one or above flow, the high response pressure transducer probe assembly comprising:
    a probe having a leading edge region and an axial length;
    an integral cylinder with an annular flange rotatably secured to the probe;
    a row of high response pressure transducers located on the leading edge region of the probe;
    a clocking plate having a circular opening with an annular flange;
    the annular flange of the integral cylinder and the annular flange of the clocking plate allowing for rotation of the probe with respect to the clocking plate;
    a bolt to secure the integral cylinder to the clocking plate and allow for the probe to be positioned and secured in place; and,
    markings on the integral cylinder and the clocking plate to indicate a position of the probe.

8. The high response pressure transducer probe assembly of claim 7, further comprising:
    a row of three hypo-tube leads opening onto the leading edge region of the probe near to the row of high response pressure transducers.

9. The high response pressure transducer probe assembly of claim 8, further comprising:

the three hypo-tube openings are positioned above the three high response pressure transducers.

10. The high response pressure transducer probe assembly of claim 7, further comprising:
an upper end of the probe is secured within a lower end of the integral cylinder.

11. The high response pressure transducer probe assembly of claim 7, further comprising:
the probe includes the integral cylinder with the annular flange formed on an upper side that engages with the annular flange on the clocking plate; and,
the probe and the integral cylinder rotate together within the annular flange of the clocking plate.

12. The high response pressure transducer probe assembly of claim 11, further comprising:
the probe integral cylinder fits with a cylindrical collar;
the cylindrical collar is secured between a lower mounting plate and an upper mounting plate;
the upper mounting plate includes a circular opening sized to fit the upper end of the probe annular cylinder; and,
the clocking plate is secured to a top surface of the upper mounting plate.

13. The high response pressure transducer probe assembly of claim 12, further comprising:
the probe integral cylinder includes an annular groove; and,
an O-ring secured within the annular groove to seal the cylindrical collar and the probe cylinder.

14. The high response pressure transducer probe assembly of claim 7, further comprising:
the high response pressure transducers have a natural frequency of around 150 to 1,000 kHz with a pressure range of around 5 to 1,000 psi.

15. The high response pressure transducer probe assembly of claim 7, further comprising:
the high response pressure transducers are capable of detecting an air flow angle within 5 seconds of starting the air flowing.

* * * * *